March 2, 1965 E. J. DIEBOLD 3,172,010
HIGH SPEED CONTACTING DEVICE
Original Filed Jan. 10, 1956 7 Sheets-Sheet 1

INVENTOR.
EDWARD JOHN DIEBOLD
BY
OSTROLENK, FABER, GERB & SOFFEN
ATTORNEYS

March 2, 1965  E. J. DIEBOLD  3,172,010
HIGH SPEED CONTACTING DEVICE
Original Filed Jan. 10, 1956  7 Sheets-Sheet 2

INVENTOR.
EDWARD JOHN DIEBOLD
BY
OSTROLENK, FABER, GERB & SOFFEN
ATTORNEYS

United States Patent Office 3,172,010
Patented Mar. 2, 1965

3,172,010
HIGH SPEED CONTACTING DEVICE
Edward John Diebold, Palos Verdes Estates, Calif., assignor to I-T-E Circuit Breaker Company, Philadelphia, Pa., a corporation of Pennsylvania
Original application Jan. 10, 1956, Ser. No. 558,349, now Patent No. 2,951,188, dated Aug. 30, 1960. Divided and this application Mar. 4, 1960, Ser. No. 12,764
5 Claims. (Cl. 317—11)

My invention relates to a synchronous circuit breaker and is a divisional application of my co-pending application Serial No. 558,349, filed January 10, 1956, now Patent Number 2,951,188, granted August 30, 1960, and assigned to the assignee of the present application.

In the past, an attempt has been made to utilize the repulsive or attractive interaction between two current carrying coils to effect the motion of a movable contact of a contact device. These previous attempts, however, have proven to be unsuccessful since a separate contact and two individual coils were used whereby one of the coils was attached to the movable contact and upon energization of the second coil the entire movable contact and coil had to be accelerated to achieve circuit interruption. It is to be realized, however, that this prior concept required the acceleration of a relatively high mass of both a coil and a movable contact. In view of this relatively high mass, the forces required to achieve a given acceleration become prohibitively high, too high for any known material to withstand. This limits the possible acceleration to a low value, which limits the value of the device. Besides the material limitation, there is also the necessity of accelerating a large mass which requires a prohibitively large amount of electrical power for the energization of the activating coil.

In accordance with the principles of my novel invention, I overcome this relatively high movable mass which must be accelerated by providing a unitary structure for both the movable contact and the electrical winding which accelerates this movable contact to a predetermined contact position responsive to the energization of an operating means, such as another winding.

More specifically, the movable contact which may be a ring-shaped conductor can make contact with stationary conductors along the surface of a cone and a circuit is opened or closed at the contact surfaces. The ring-shaped movable contact is further positioned to be closely situated to an operating winding so as to obtain good coupling between the operating winding and the winding formed by the ring shape of the movable contact and the operating winding is energizable by a strong current of very high frequency.

If now the primary winding is energized, as by means of the discharge of a capacitor, an extremely high current of opposite direction and same frequency will be induced in the ring-shaped contact. A repelling force is then existent between the coils which increases with the square of the current flowing therethrough. Since, however, this force is needed for only a very short time, an exceedingly high current is permissible because of the short time it flows in which coil heating takes place.

In view of the extremely high permissible current, tremendous forces come into play in accelerating the movable contact with respect to the stationary contacts. Because of the unitary structure of winding and contact, such as a solid ring of metal, the tremendous forces do not require any means of transmission of force, i.e., no movable structural parts are needed. Hence, no limits are encountered due to the limited strength of the materials which are being used.

Because of this tremendous acceleration imparted to the movable contact, the instantaneous break-down voltage between the movable contact and its cooperating contact will always be greater than the instantaneous recovery voltage that appears across these separating contacts. This effect may be enhance by operating my novel contact device in an atmosphere under a high pressure in order to increase the dielectric strength between the separating contacts and thereby increase the instantaneous break-down voltage. Clearly by providing a system in which the instantaneous break-down voltage between the separating contacts will always be greater than the recovery voltage thereacross, an arc will not be formed and arc extinguishing means need not be provided.

In the event of the formation of an arc, if the contacts are separated slightly prior to a zero current value, the magnetic field in the region of the arc will be in such a direction as to cause the arc to rotate rapidly around the vertical axis of the coils. Hence, the arc is burning on relatively cool electrodes and upon passage of the current through zero, the arc will extinguish.

I have found that due to the inherently low coupling between the operating winding and the movable winding, that the efficiency of my novel system is low. This may be appreciably increased, however, by providing a ferrite core to extend through the two coils and appreciably increase the efficiency of the system.

Accordingly, it is a primarly object of my invention to prove a high speed contacting device wherein the acceleration imparted to a movable contact is such that the instantaneous break-down voltage between separating contacts is always greater than the instantaneous recovery voltage across the separating contacts.

Another object of my invention is to provide a movable contact for a high speed contacting device which is so constructed as to cooperate with a second contact for contacting purposes as well as to provide an electrical winding for cooperation with an operating magnetic field.

Still another object of my invention is to provide a high speed contacting device wherein a unitary structure serves as a movable contact which is so shaped as to form an electrical winding and to then provide a second winding which is energizable responsive to predetermined electrical conditions to thereby induce a current in the above-mentioned movable contact, which current shall be effective to create a magnetic field which will repel the magnetic field of the relatively stationary winding to move the movable contact towards a new position.

Still another object of my invention is to provide a high speed contacting device wherein a unitary movable contact and short circuited winding interacts with an operating winding whereby energization of the operating winding effects motion of the movable contact and the complete system operates under a high pressure gas to thereby increase the dielectric constant between the separating contacts.

The operating winding of my novel invention may be formed of a conductor which is relatively thin and wound in the form of a spiral or pancake in which the height of the conductor is substantially larger than its radial diameter. If now a capacitor discharge is used for energization of the operating winding, it is to be realized that this discharge will be of an extremely high frequency.

The novel movable contact of my invention may be constructed in a similar way which, by way of example, could be a single turn or ring in which the height of the turn has a dimension of the same order of magnitude or greater than the radial diameter of the turn. When a high frequency current is induced in this movable contact due to a current in the operating winding, it is understood that this current will be of the same high frequency as that in the operating winding. In view of this extremely high frequency, the so-called proximity effect will be very great.

As is well known, the proximity effect in the case of two closely coupled coils will cause the current in each coil to have a current density of unequal value throughout the cross-sectional area of the current conductors. More specifically, more current will flow through the copper cross-sectional area of the conductor which is in closer proximity to the coil with which it is interacting. In view of this effect, it is, therefore, seen that the effective distance between coils will be decreased to thereby increase the coupling between coils and the repelling force which is inversely proportional to the square of this coupling distance.

Accordingly, another object of my invention is to construct at least one of the operating windings or the movable winding of my novel high speed contact device in such a manner that proximity effects will be brought into play to thereby increase the coupling between the coils.

Another object of my invention is to provide an operating winding which is formed of a spiral winding wherein the height of the conductor used is substantially larger than its radial diameter to thereby introduce an appreciably large proximity effect due to the high frequency discharge of an energizing capacitor.

Still another object of my invention is to form both the operating winding and the movable contact of my novel high speed contact device in such a manner that the height of the conductors forming these windings is substantially comparable to or greater than the radial diameter of the conductors, whereby proximity effect is brought into play to increase the coupling between the operating winding and the movable contact.

After contact separation, the movable contact is moving with considerable momentum, and it must be braked to a stop and either maintained in a disengaged position or be allowed to return to the contact engaged position. For this purpose I provide a novel braking cylinder or chamber which has an internal cross-sectional configuration which will receive the shape of the movable contact ring. Hence, the contact ring, which may be guided into the cylinder by means of a post extending through its center, will upon entering the cylinder begin to compress the air between the ring and the opposite end of the cylinder which is enclosed. As the air within the cylinder is compressed by the motion of the contact ring therein, it is seen that a force is developed which is in a direction to oppose the motion of the ring.

Furthermore, if the contacting device is operating under a high gas pressure in order to achieve a high dielectric constant between the separating contacts, it is clear that this opposing force will be greatly increased.

When the kinetic energy of the movable contact is finally completely transferred to compress the air between the movable contact and the enclosed end of the cylinder, it is to be realized that a force will now be exerted by this compressed air to accelerate the movable contact in the opposite direction.

In order to prevent this rebound of the movable contact, I provide an annular depression in the cylinder wall which is so disposed that upon passage of the movable contact, a port will be available to allow the escape of the compressed air between the movable contact and the end of the cylinder wall. After so relieving the compressed air captured between the movable contact and the end of the cylinder, the contact may be latched in a disengaged position or, if desired, the contact may be allowed to return to its engaged position under the effect of a biasing force, such as gravity or a spring means.

Accordingly, another object of my invention is to provide a braking means for dissipating the kinetic energy of the movable contact after it has moved toward a contact disengaged position.

Another object of my invention is to provide a guide which extends through the center of the movable contact ring for guiding its motion between a contact engaged and contact disengaged position.

Another object of my invention is to provide a braking means for the novel movable contact of my invention which is comprised of a cylinder having an enclosed end and a cross-sectional area of a shape which will cooperate with the cross-sectional area of the movable contact.

Another object of my invention is to brake the motion of a movable contact by bringing it into an enclosed cylinder and allowing it to compress the air between the enclosed end of the cylinder and the contact ring itself whereby forces due to the pressure of the compressed air tend to retard the motion of the contact ring.

Another object of my invention is to guide the movable contact into a cylinder having an enclosed end and an annular recess in the interior thereof whereby compressed air between the enclosed end of the cylinder and the contact ring itself is allowed to escape when the contact passes this annular recess.

It has been described above that the motion of the movable contact may be braked and the movable contact is thereafter allowed to return to its former position after contact disengagement has taken place between the movable contact and its cooperable contact. If this is the case and it is desirable to prevent contact engagement, it is possible to move the cooperating contact, which may be a pair of relatively stationary bridging contacts, to a remote position responsive to movement of the movable contact to a disengaged position.

This withdrawal or movement of the stationary contacts to a remote position after contact disengagement may in fact be necessary to defeat a second contact engagement in case reclosing of the circuit is to be avoided. In an actual structure, it can be realized that the stationary contacts are biased into engagement with the movable contact to obtain high contact pressure. This biasing may be accomplished by a spring means or any other desired means. However, upon disengagement of the contacts, a rather high force would have to be brought into play in order to reengage the cooperating contact by overcoming the biasing means of the relatively stationary contacts.

The withdrawal of the stationary contacts has the advantage of making the circuit breaker trip free, i.e., then the circuit breaker opens under the action of the movable contact being expelled violently, the stationary contacts are thereafter retracted, leaving the circuit breaker open when the movable contact assumes the closed position again. Closing of the circuit breaker is effected by pushing the stationary contacts adjacent the movable contact. When closing against a fault, the movable contact can be expelled without delay.

This withdrawal of the stationary contacts may be accomplished by various types of hydraulic or electromagnetic means which are energized responsive to the motion of the movable contact or, if desired, responsive to the means which energizes the operating winding.

Still another manner in which withdrawal of the stationary contacts may be effected is by the utilization of the compressed air in the breaking cylinder of the movable contact.

Accordingly, an important object of my invention is to provide means whereby the contact cooperating with the movable contact is so constructed that it may be removed or withdrawn from the contact engaging area responsive to disengagement or motion of the movable contact.

Another object of my invention is to provide bridging stationary contacts for the movable contact ring of my invention which are so constructed as to be normally biased into contact engagement with the movable contact ring and are withdrawn by hydraulic, pneumatic or electromagnetic means responsive to contact disengagement.

It has been seen that my novel high speed contact device can successfully interrupt circuits which may have extremely high short circuit capacities and very high rates of recovery voltage because the cooperating contacts separate so fast that the instantaneous breakdown voltage is always higher than the instantaneous recovery voltage.

Clearly, it is desirable to reduce the rate of rise of recovery voltage if possible, and this is possible by connecting a capacitor across the contacts. By a further extension of this idea to the case in which a pair of stationary contacts are utilized and the movable contact ring comes into bridging contact engagement therewith, I have found that by connecting a center tapped capacitor in series with the stationary contacts and connecting the center tap to the movable contact, I obtain an equal distribution of the recovery voltage across the two breaks of the contact device, reduce the rate of rise of recovery voltage and also partially eliminate the high frequency oscillations causing the extremely high recovery rates.

Accordingly, a still further object of my invention is to utilize a center tapped condenser in conjunction with a contacting device constructed in accordance with my novel principle in which a pair of stationary contacts are utilized for bridging contact cooperation with a movable contact ring wherein the outer ends of the condenser are connected in series with the stationary contacts and the center tap of the condenser is connected to the movable contact to thereby decrease the rate of rise of recovery voltage, equally distribute the recovery voltage across the two breaks and partially eliminate the high frequency oscillations which cause high rate of rise of recovery voltage.

When utilizing an operating winding which is energized by the discharge of a capacitor, it is desirable to have this energization take place for a subsequent contact disengagement immediately prior to a zero current value in the circuit being protected. This is extremely desirable, first, because the interrupting duty on the disengaging contacts is decreased and, secondly, any arc which is formed will extinguish when the current subsequently passes through the zero current value. This is particularly true in the case of my novel device since the arc will move extremely rapidly around the axis of the movable contact and will be in contact with this relatively cool body.

I, therefore, provide a novel trip circuit which is effective to connect a charged capacitor to the operating coil a time immediately prior to an instantaneous zero current value irregardless of the current value at which the fault occurs on the circuit. That is to say, if the fault occurs during a relatively high instantaneous current value, the trip is delayed until this current value, in the case of an A.C. circuit, decreases to substantially zero value. Obviously, this same principle may be utilized for a reverse current trip in the case of a D.C. circuit.

More specifically, I provide a trip circuit in which the line current is measured with a current transformer and the output of the current transformer is connected to a saturable reactor which in turn delivers an output pulse slightly prior to a measured zero current value of the current transformer. The pulse circuit is then connected in series with a fault sensing device which upon occurrence of a fault allows the pulse when created to operate a switching means which in turn connects a charged capacitor to the operating winding of the contact device. Hence, the operating winding is energized immediately prior to the first zero current value after the occurrence of a fault.

Accordingly, another object of my invention is to provide a trip circuit for connecting a capacitor to the operating winding of my novel contacting device only immediately prior to a zero current value through the cooperating contacts irregardless of the instantaneous current value at which a signal is given to operate the contacts at a disengaged position.

Another object of my invention is to provide a trip circuit which measures the circuit current to deliver a pulse slightly prior to a zero current value which pulse is connected to a switching means which in turn connects the charged capacitor to the operating winding to thereby operate the contacting device only prior to a zero current value irregardless of the current value at which the signal to operate the contact device takes place.

All of the preceding objects and many others will become apparent when taken in conjunction with the description in which.

Figure 1:
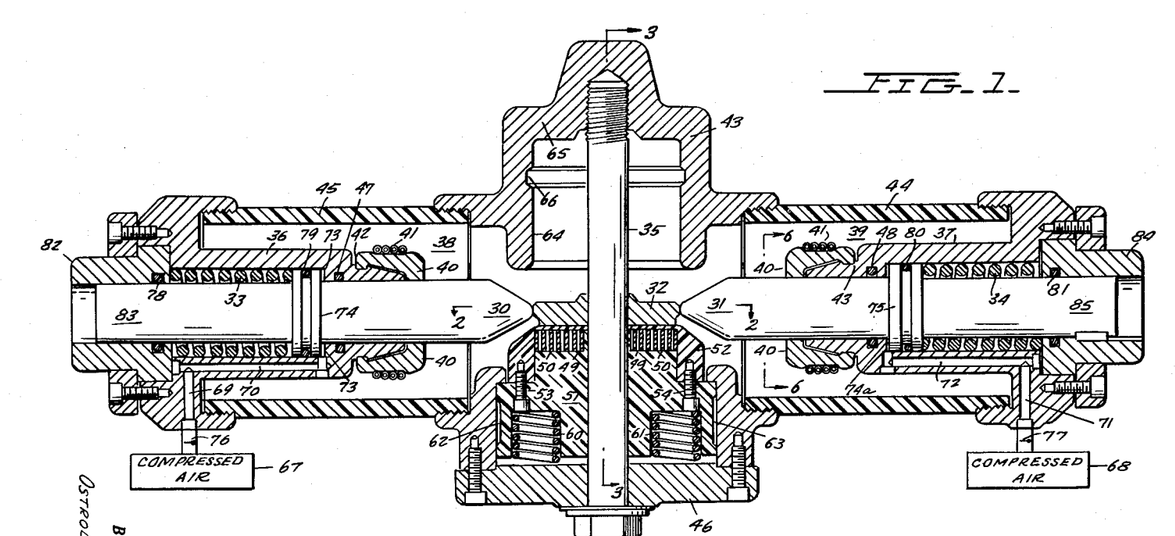
FIGURE 1 shows a cross-sectional view of one embodiment of my novel invention.
Figure 1A:
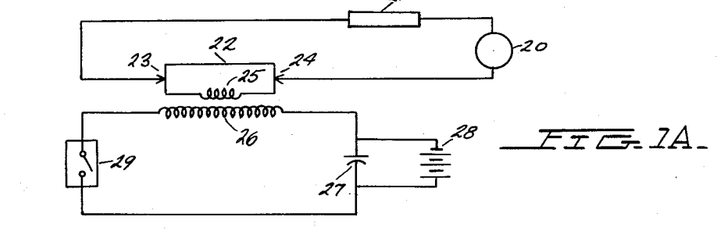
FIGURE 1a shows my invention in a schematic form to more specifically illustrate the principles of its operation.

The basic principle of my novel invention may be more thoroughly understood with reference to the schematic drawings of FIGURE 1a. FIGURE 1a shows a source of electrical energy 20 as being connected in series with a load 21 and a contact device indicated generally at 22. The contacting device is comprised of a pair of stationary contacts 23 and 24 which are schematically shown as being bridged by a movable contact 25 which, as well as being the movable contact, comprises a short circuited winding.

A second winding or operating winding 26 is positioned with respect to the coil 25 in such a manner that energization of the coil 26 will induce a current in the coil 25 and their mutual magnetic fields will be in such a direction as to drive the coil 25 away from the coil 26 and out of engagement with the stationary contacts 23 and 24.

The operating coil 26 is further shown as being connected in series with a capacitor 27 which is maintained in a charged condition by the D.C. source 28. A switching means 29 is then provided to selectively connect the charged capacitor 27 in series with the coil 26 at any desired time. The switching means 29 may, if desired, be operated responsive to a predetermined electrical condition and the circuit supplied by the energy source 20, and as will be shown hereinafter, may be further constructed as to discharge the capacitor 27 through coil 26 only immediately prior to a zero current value through the contact structure 22.

Figures 2, 3, 4:
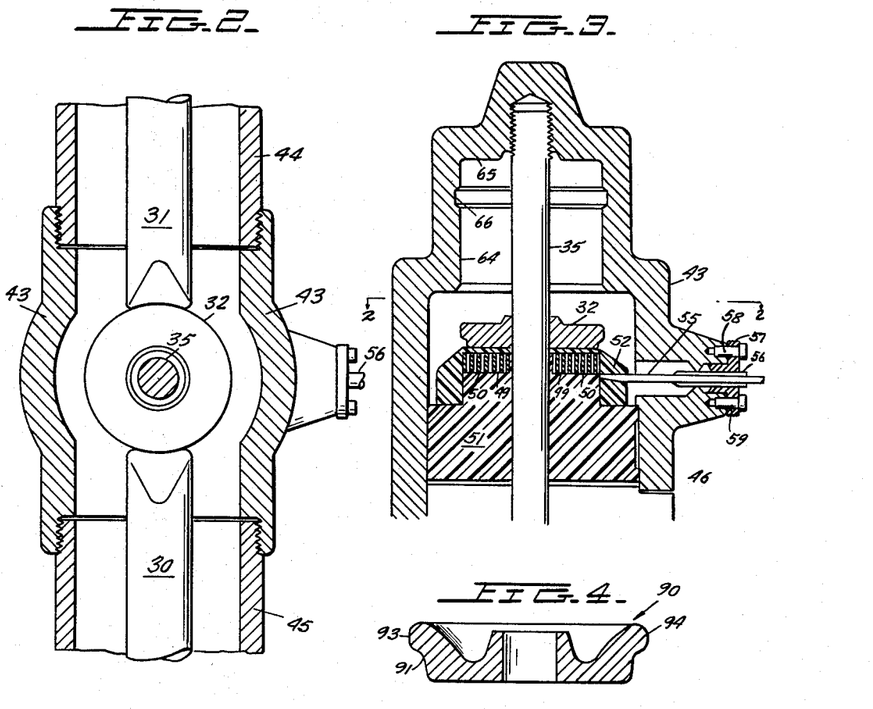
FIGURE 2 shows a view taken across the lines 2—2 of FIGURE 1.
FIGURE 3 shows a view taken across the lines 3—3 of FIGURE 1.
FIGURE 4 shows a second embodiment which may be assumed by the novel unitary movable contact and short circuited winding of my novel invention.

One possible embodiment of a contacting device which will operate in accordance with the principle set forth in conjunction with FIGURE 1a is shown in FIGURES 1, 2 and 3. More specifically, FIGURES 1 and 2 specifically show a pair of relatively stationary contacts or side conductors 30 and 31 which are biased into contact engagement with the movable ring contact 32 by means of the biasing springs 33 and 34, respectively. As will be described more fully hereinafter, the side conductors 30 and 31 are so constructed as to be withdrawable to a disengaged position responsive to movement of the movable ring contact 32 to a disengaged position.

It is seen in FIGURES 1 and 2 that the moving ring contact 32 has the shape of a flat disc and is guided by a cylindrical rod 35. The ring contact 32 may be constructed of a hard aluminum material with silver plated contact surfaces on its circumference. The edges of all the contact surfaces are well rounded in order to prevent spark over between sharp points of the movable contact and the stationary contact. As is seen more specifically with respect to FIGURE 2, the side contacts 30 and 31 are constructed to have rounded portions so that they may fit closely upon the cylindrical part of the ring and provide a substantially large contact area.

The side conductors 30 and 31 may be made of a bronze material with silver plated contact surfaces for cooperation with the contact ring 32. Since the side contacts 30 and 31 are to be movable out of the area of contact engagement with respect to the ring contact 32, these side conductors are connected to the outer conductors 36 and 37, respectively, by means of the identical brush arrangements shown generally as brush assemblies 38 and 39, respectively, in FIGURE 1.

Figure 6:
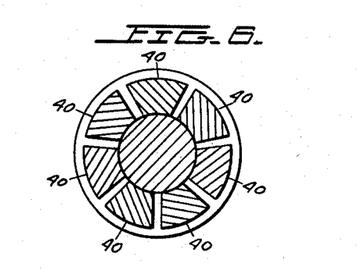
FIGURE 6 shows a view taken along the lines 6—6 of FIGURE 1 to specifically illustrate the manner in which the stationary contact may be fastened to the input current conductors and still be able to withdraw the stationary contact subsequent to contact disengagement.

This brush arrangement which may be specifically seen in conjunction with FIGURE 6 is comprised of a plurality of brush members 40 which are biased into engagement with the side conductors 30 and 31 by means of the springs 41 which also maintain the brush member 40 in the groove 42 of the conductor 36 and the groove 43 of the conductor 37.

It is to be noted that the conductors 36 and 37 may be so constructed as to complete a generally air-tight housing around the various components of the contact device. In this case, it would then be possible to operate the device under a high gas pressure whereby the dielectric strength between separating contacts would be increased. This generally air-tight structure is shown as comprising cylinder 43, hollow member 44, hollow member 45, the conductors 36 and 37 and the base member 46. Hollow members 44 and 45 are of insulating material to thereby electrically insulate side conductors 30 and 31. The air is further prevented from escaping from between the side conductor 30 and the conductor member 36 by means of the gasket 47 and similarly a gasket 48 is provided to prevent air escape between the side conductor 31 and the conductor member 37.

The operating coil of the winding which is operative to cause motion of the movable contact ring 32 is seen in FIGURES 1 and 3 as comprising the spirally wound winding 49 which is embedded in a supporting insulating material shown as the cross-hatched portions 50. The operating winding assembly is then positioned on top of a block of insulating material 51 and a cap of insulating material 52 is then bolted by means of the bolts 53 and 54 in such a manner as to securely maintain the spiral winding 49 on top of the insulating block 51. The top of the cap 52 may then be used as a seat for the contact member 32 when it is in the normally engaged position and further provide for an accurately controlled minimum separation between the contact ring winding 32 and the spirally wound operating winding 49.

FIGURE 3 specifically indicates the manner in which the leads of the spirally wound operating winding 49 are taken out of the air-tight enclosure housing the contracting device. That is to say, the leads may be taken out through the common tube 55 which is taken through a gasket 56 and the air-tight seal shown generally at 57 is being maintained to the housing 43 and 46 by means of the bolts 58 and 59. This allows the leads to be positioned next to one another to thereby maintain a small leakage reactance.

The operating winding support 51 is, in FIGURE 1, further seen to be constructed to contain the springs 60 and 61 which maintain the structure 51 at a predetermined distance from the top of the base member 46. In effect, the springs 60 and 61 serve a shock-absorbing function. For when the operating winding 49 is energized to drive the ring contact 32 to a disengaged position, it is to be realized that an equal and opposite effect will be imparted to the operating winding assembly 51. By providing the springs 60 and 61, this shock or impulse is more easily absorbed without breakage of any of the associated components.

Pneumatic cushioning is also provided for shock-absorbing purposes since the air in the space between the operating winding support 51 and the bottom member 46 is compressed. This compressed air may then be slowly exhausted through the ports 62 and 63 at the sides of the structure 51.

It is now understood, in view of the discussion of the operation of FIGURE 1a, that when the operating coil 49 of FIGURES 1 and 3 is energized, as by the discharge of a capacitor, an extremely high current will be induced in the ring 32 and this ring will be driven away from the spiral winding 49 to a disengaged position with respect to the side contacts 30 and 31. It is, however, necessary to provide a means to absorb the energy of the ring contact 32 once the contact disengagement has been effected. This energy absorbing means is shown in FIGURES 1 and 3 as the cylinder 43.

More specifically, the cylinder 43 has an internal cross-sectional area which will cooperate with the shape of the movable contact 32. Hence, in the case of the contact 32 which has a substantially circular shape, the internal cross-sectional area of the walls 64 of the cylinder 43 will have a corresponding circular shape.

Therefore, when the ring contact 32 is driven away from the operating winding 49 by their mutual magnetic fields, the ring contact 32 will enter the cylinder 43 and compress the air, which may already be in a highly compressed state, between the top surface of the movable contact 32 and the enclosed portion 65 of the cylinder 43. In view of this compression, a force will develop tending to retard the motion of the movable contact 32. That is to say, the kinetic energy of the ring contact 32 will be transferred to the compressed gas within the cylinder 43.

When, however, a complete transference of energy takes place, it is seen that the ring contact 32 will now be driven back towards the position of contact engagement by means of the compressed air within the cylinder. In order to avoid this, an angular depression of recess 66 is provided within the cylinder wall 64 so that upon passing the angular depression 66, a port will be formed between the depression 66 and the movable contact 32 to allow the escape of compressed air between the movable contact 32 and the enclosed end 65 of the cylinder 43. In view of this exhaust of the gas, which is at a higher pressure than the gas at the bottom of contact 32, it is seen that a great deal of the rebound force will be exhausted. Upon continued travel past the angular depression 66 and toward the enclosed end 65, the remainder of the kinetic energy of the movable contact 32 will be exhausted in a further but much smaller compression of the air captured between the contact 32 and the enclosed end of the cylinder 43.

In view of this slighter compression of air, the ring contact 32 will be brought to a standstill and eventually thrown back to pass the angular depression 66 with substantially the same velocity with which it had passed it in the opposite direction. After passing the port 66, however, it is to be realized that a decompression will take place within the cylinder 43 until the contact 32 emerges therefrom. This decompression will serve to decrease the velocity of the ring contact 32 until it subsequently is returned to the original contact engaged position at a very low velocity.

If desired, the angular depression 66 could have been replaced by a valve means whereby air is allowed to escape or is brought into another section of the apparatus. In this case, as is true of the previously described case, it would be possible to absorb the complete kinetic energy of the movable contact 32 and to thereafter latch it or maintain it in a disengaged position when it reaches a predetermined distance of separation from the cooperating contacts 30 and 31.

If, however, the contact 32 is allowed to return to its original position as has been described in conjunction with the structure shown in FIGURES 1, 2 and 3, it would be extremely undesirable to allow contact engagement to reoccur between the contacts 30 and 31 since this would reestablish the disengaged circuit.

If this is to be avoided and if the contact 32 is not to be latched or maintained in a disengaged position, I propose to so construct the side conductors 30 and 31 that they are moved or withdrawn to a remote position responsive to the motion of the contact 32.

In FIGURE 1, compressed air supplies 67 and 68 are schematically shown as being connected to the ports 69, 70, and 71, 72 respectively. It is to be noted that the channel 70 will lead compressed air into the space 73 between the side of the conductor 36 and the piston 74 of the side conductor 30 and similarly, the channel 72 will lead compressed air into the space 74a which lies between the wall of the conductor 37 and the piston 75 of the side conductor 31. If, therefore, the valves shown schematically as valves 76 and 77 of compressed air supplies 67 and 68, respectively, are operated simultaneously with the energization of the coil 49 for moving the movable contact 32 to a disengaged position, then it is seen that compressed air will flow into the openings 73 and 74a to thereby drive the pistons 74 and 75 in a direction away from the area of contact engagement with the contact 32. By providing the gaskets 78 and 79 for the side conductor 30 and the gaskets 80 and 81 for the side conductor 31, it is seen that this compressed air which is used to drive the side conductors 30 and 31 to a removed position may not escape from between the housing members 82 and portion of 83 of the side conductor 30 and similarly from between the housing member 84 and portion 85 of the side conductor 31.

When it is desired to close the circuit once again, it is only necessary to defeat the compressed air supplies 67 and 68 whereby biasing springs 33 and 34 will move side conductors 30 and 31 back into engagement with the movable contact 32 which rests on insulating cap 52. Closing the circuit breaker by moving the stationary side contacts into engagement with the movable contact situated in its rest position of the closed breaker permits it to interrupt a short circuit at closing by expelling the movable contact even while the stationary side contacts are still in the closing stroke. Hence, the circuit breaker is trip free.

It is to be noted that this effect could be similarly obtained in the absence of the compressed air supplies 67 and 68 by leading the air, which would be compressed in the cylinder 43 by the motion of the movable conductor 32, to the openings 74a and 73.

Figure 5:
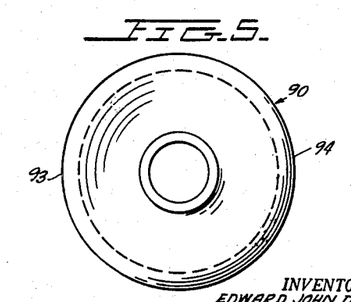
FIGURE 5 shows a top view of the novel contact of FIGURE 4.

It is obvious that many modifications of the components shown in the contact device of FIGURES 1, 2 and 3 are possible and come within the scope of my novel invention. By way of example, the movable contact ring 32 of FIGURE 1 could have assumed the shape shown in FIGURES 4 and 5 which show a contact ring 90 having an annular contact 91 and contact surfaces 93 and 94 which could cooperate with side conductors. Obviously, contact surfaces 93 and 94 could be along any circumferential portion of the ring 90. In the case of the movable contact of FIGURES 4 and 5, it is seen that no sharp edges are provided which would allow flashover between the movable contact 90 and cooperating stationary contacts. Similarly, the cut away portion 91 allows a more rapid increase in separation between the movable contact 90 and its cooperating stationary contact than would a contact having the shape of contact 32 of FIGURE 1. Hence, the rate of rise of flashover voltage is increased.

Figures 7, 9:
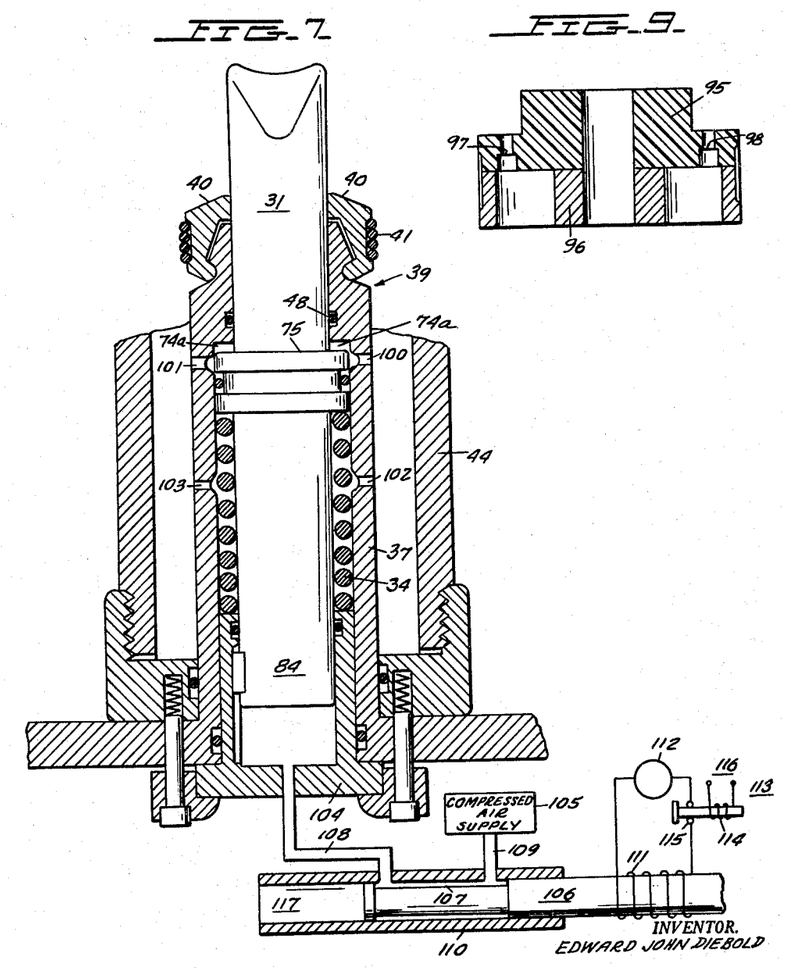
FIGURE 7 shows an embodiment of a stationary contact structure which differs from that seen in FIGURE 1.
FIGURE 9 shows an embodiment of a structure which may be used to support an operating winding.

The support block 51 of FIGURE 1 which supports the spiral winding 49 could have been constructed as shown in FIGURE 9 of an upper insulating section 95 and a lower section of high density material 96. The two sections 95 and 96 may then be maintained together by a bolt means which serves a dual function by extending through the openings 97 and 98 to fasten a top cap such as the cap 52 of FIGURE 1 which would in turn maintain the spiral winding or operating winding to the insulated block 95 of FIGURE 9. By so providing this additional mass, it is seen that the shock-absorbing properties of the structure are enhanced since a greater mass must be accelerated by the same force. Hence, the acceleration of the composite blocks 95, 96 of FIGURE 9 would be less than that of the block 51 of FIGURE 1 and stress problems would be reduced accordingly.

The side conductors 30 and 31 could be modified so that they may operate on an underpressure principle for withdrawal to a remote position after contact disengagement as is shown in FIGURE 7 with reference to side conductor 31. Obviously, side conductor 30 could be constructed in an identical manner. In the case of FIGURE 7, it is seen that the space 74a which lies between the conductor 37 and the piston member 75 is, because of the ports 100 and 101, at the same pressure as is the rest of the interior of the contacting device. Similarly, the ports 102 and 103 allow the space containing the spring 34 to be under the same pressure as is the rest of the apparatus. This is clearly distinguished from the case of FIGURE 1 in which the space 74a was, in view of the gaskets 48 and 80, at a much lower pressure than was the rest of the apparatus.

In the case of FIGURE 7, however, it is seen that the space defined by the end portion 84 of the side conductor 31 and the housing member 104 are at a pressure defined by the pressure of the compressed air supply 105 when piston 106 is positioned to bring port 107 into engagement with both passages 108 and 109. Hence, pressure conditions during normal contact engagement in the case of FIGURE 7 will have the side conductor 31 biased into engagement with a movable ring contact by both the spring 34 and the pressure of compressed air supply 105.

Plunger 106 is movable within the cylinder 110 by means of a coil 111 when the coil is energized by an electrical voltage source 112. A relay shown generally at 113 is then provided to have a coil 114 and a pair of contacts seen generally at 115 which are engaged to thereby connect the voltage source 112 to the coil 111 upon energization of the coil 114 from the terminals 116. Upon contact engagement of the contacts 115, the coil 111 is energized and the plunger 106 will be rapidly moved to the right to thereby bring the port 107 out of registry with the air passage 108 and allow the air passage 108 access to the open end 117 of the cylinder 110. Under this condition, it is seen that the pressure upon the end 84 of the side conductor 31 is substantially reduced and the pressure in the volume 74a which is at the relatively high pressure under which the system operates is then sufficient to drive the complete assembly away from the area of contact engagement.

If, therefore, the terminals 116 are electrically connected to be energized responsive to the same electrical conditions which actuate the energization of the operating winding, such as the operating winding of FIGURE 1, then it is clearly seen that the side conductor 31 will be moved away from the area of contact engagement at the same time that contact disengagement takes place. Hence, upon subsequent return of the movable contact to its original position, a re-engagement of the contacts will not occur.

Figures 8, 10, 11:
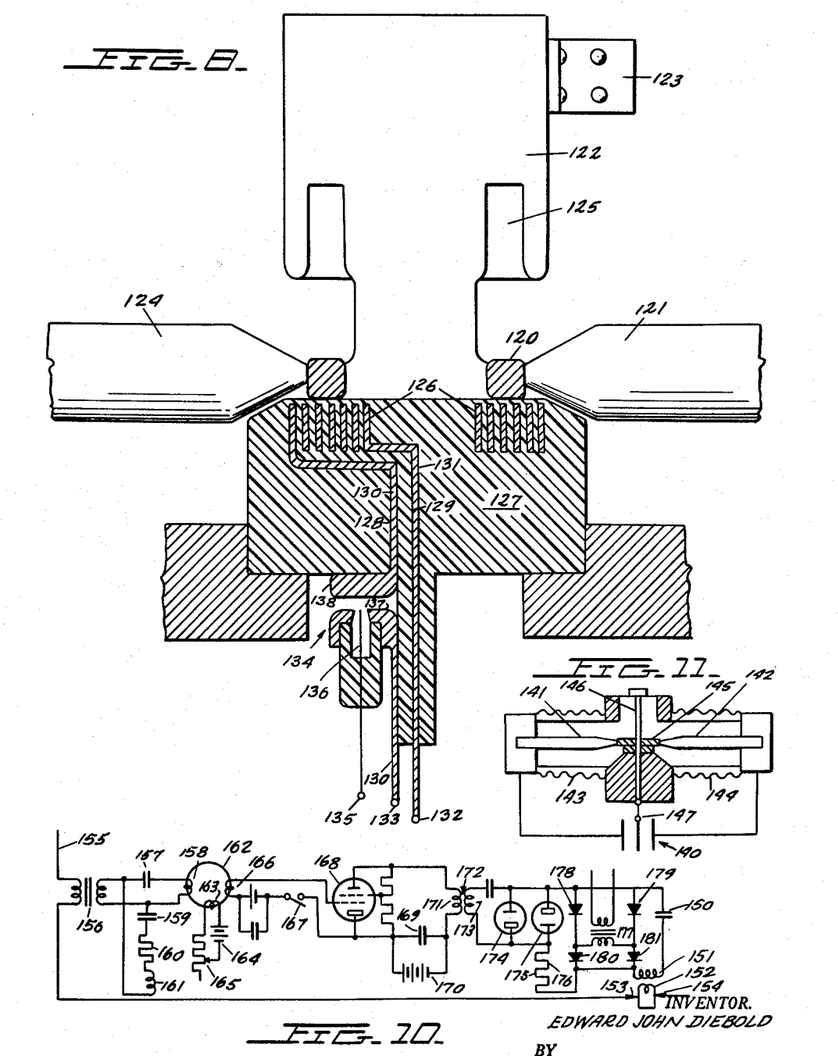
FIGURE 8 shows another embodiment of my novel invention.
FIGURE 10 shows a tripping circuit which in accordance with my novel invention may be used to energize an operating winding only at a time immediately prior to a zero passage of current through the cooperating contacts.
FIGURE 11 shows a schematic illustration of my novel invention wherein a pair of stationary contacts are bridged by a movable contact and a center tapped condenser is connected to distribute the recovery voltage equally on both breaks of the bridging contact arrangement.

FIGURE 8 illustrates a second embodiment which could be taken by the circuit interrupting device of FIGURE 1. In the case of FIGURE 8, however, the movable ring contact 120 completes an electrical path between current carrying side conductors 121 and 124 which may be constructed in the same manner as was side conductor 31 of FIGURE 1, and the contact post 122 which conducts the current to a terminal 123. Side conductors 121 and 124 may be part of an arrangement of radial side conductors forming a pattern similar to the one shown in FIGURE 6 carrying current radially over the whole ring.

The current carrying member 122 is further provided with a recess portion 125 which acts as did the cylinder 43 in the case of FIGURE 1 to absorb the kinetic energy of the movable contact 120. If desired, the recess 125 may be provided with an angular depression which will act in the same manner as did the angular depression 66 of FIGURE 1 in order to allow the movable contact 120 to return to its original position at substantially a zero velocity. FIGURE 8 further shows a spiral wound operating winding 126 which in this case is shown as being embedded in a material such as an epoxy resin.

The epoxy resin support 127 further encloses the leads 130 and 131 of the spiral winding 126 out of the support member 127.

It is further seen in FIGURE 8 that the lead 131 comes directly out to the terminal 132 while the lead 130 which is terminating at the terminal 133 is interrupted by the air gap shown generally at 134. Within the air gap 134 and connected to terminal 135 is disposed an auxiliary electrode 136 which is so constructed that when a sufficient potential is impressed between the terminals 133 and 135 a flash over will occur between the electrodes 136 and 137 to thereby ionize the air within the air gap 134.

Upon this ionization, it is seen that the electrode 138 of the conductor 130 and the electrode 137 of the conductor 130 are electrically connected by virtue of the ionized air within the air gap 134.

Therefore, if a charged condenser is connected across the terminals 132 and 133 and the signal to initiate contact disengagement between the contacts 120 and 121 of FIGURE 8 is impressed across the terminals 133 and 135, then upon this signal, the air gap 134 will be broken down and the charged condenser will be allowed to discharge into the winding 126 to thereby effect contact disengagement.

It has been previously mentioned that in order for my novel high speed contact device to work effectively, that the instantaneous breakdown voltage between the separating contacts must be greater than the instantaneous recovery voltage at all times. By placing a condenser across the separating contact, the rate of rise of the recovery voltage will be decreased. In the case of a contact device having a pair of stationary contacts which are bridged by a movable contact, I have found that by utilizing a center tapped condenser and connecting the condenser across the stationary contacts and connecting the center tap to the movable contact I can equally distribute the recovery voltage across each break.

If this were not the case, it would then be possible that the recovery voltage would not be equally distributed and that the instantaneous recovery voltage across the break of one of the stationary contacts and the movable contact would be higher than the flash over voltage to thereby create a destructive arc.

This novel principle is schematically shown in FIGURE 11 wherein a capacitor 140 is connected across the side conductors or contacts 141 and 142 which are assembled in the insulators 143 and 144. The movable contact 145 is then shown as being guided on a conductive guide post 146 which is in turn connected to the center tap 147 of the condenser 140. By so forming this connection, I can now assure that the instantaneous recovery voltage between the side contact 141 and the movable contact 145 and the side contact 142 and the movable contact 145 will be equally distributed. Similarly, the capacitor, when so connected, will tend to smooth the higher harmonics of the recovery voltage which are primarily responsible for the high rate of increase of this recovery voltage.

It has been previously mentioned that a tripping circuit would be desirable such that contact disengagement occurs slightly prior to a zero current value. FIGURE 10 presents a novel circuit that will accomplish this end wherein the capacitor 150 serves to discharge through an operating winding 151 to thereby impart a repelling force to the unitary contact and coil 152 which connects the stationary contacts shown schematically as 153 and 154.

In FIGURE 10 it is seen that the opening coil 151 could correspond to operating coil 49 of FIGURE 1, the movable contact 152 could correspond to the movable contact 32 of FIGURE 1, and that the stationary contacts 153 and 154 correspond to the side conductors 30 and 31 of FIGURE 1.

Conductor 155 schematically represents a portion of a circuit which is being protected by the contact device including the contacts 152, 153 and 154. The instantaneous current in the conductor 155 is measured by a high quality current transformer 156, the output of which is impressed on a first circuit including the capacitor 157, winding 158 and a second circuit comprising a capacitor 159, resistor 160 and inductor 161. The current through the coil 158 is forced, by proper circuit design of the components 157 through 161, to lead the current measured at the output of the current transformer 156. The amount of this advance will, as will be seen hereinafter, determine the pretripping time or the amount of time prior to the passage of a zero current value at which the contact 152 will disengage the stationary contacts 153 and 154 of FIGURE 10.

Winding 158 is the input winding of a transductor 162 which may have a core of highly saturable type material. The transductor 162 is more specifically constructed to include a D.C. pre-excitation circuit, including the winding 163, D.C. source 164 and adjustable resistor 165, such that a voltage pulse will be generated in the secondary winding 166 when the primary current approaches a zero value.

In the event that the circuit protecting device, by way of example, is being utilized for over-current protection, then an overcurrent relay 167 is provided as is shown in FIGURE 10 to be normally open and to close upon the occurrence of a fault condition. Hence, upon the occurrence of a fault, the relay contact 167 closes and the next pulse produced in the winding 166 will reach the grid of the tube 168 to thereby make this tube conductive. The capacitor 169 which is normally charged by the D.C. source 170 thus discharges through the primary winding 171 of the high voltage air transformer 172. In view of voltage across the primary winding 172, a high voltage is impressed across the secondary winding 173 of the transformer 172 to thereby cause the tubes 174 and 175 to flash over. It is to be noted that the high voltage on the winding 173 will be at a very high frequency to thereby make the time difference of discharge of the tubes 174 and 175 negligible.

Upon flash over of the tube 174, the capacitor 150 which is maintained in a charged condition by means of a D.C. source, including the transformer 177 and the rectifiers 178 through 181, may now discharge itself through the operating winding or drive coil 151 to thereby effect contact disengagement between the movable contact 152 and the stationary contacts 153 and 154. Resistor 176 is provided in order to dampen and extinguish the high frequency oscillations produced in the discharge of the capacitor 150.

It is to be specifically noted that the discharge of capacitor 150 to effect contact disengagement or motion of the movable contact 152 is effected only upon the delivery of a pulse from winding 166 after the closure of the contact 167, this pulse occurring immediately prior to the occurrence of a zero current value in the conductor 155. Hence, any arc that is formed upon contact separation will be extinguished upon passage of the current through its zero value.

Figures 12, 12A:
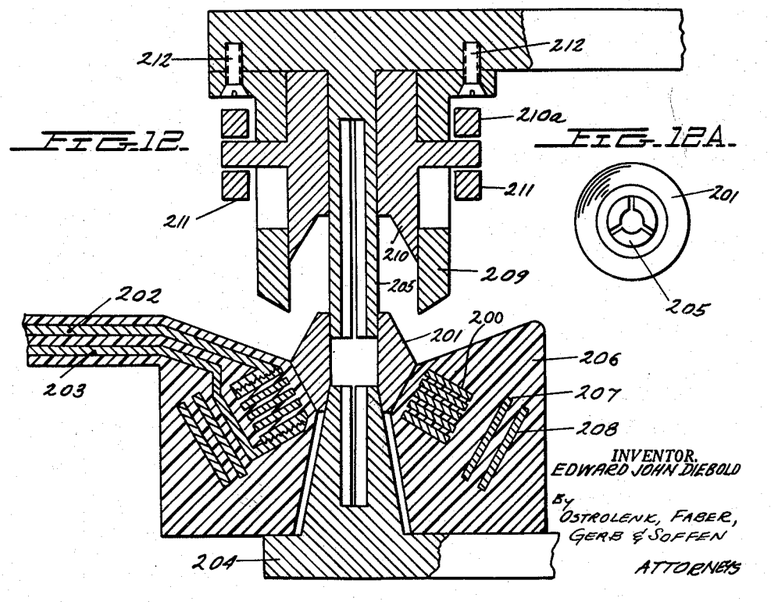
FIGURE 12 shows a still further object of my invention.
FIGURE 12a shows a view of the contact structure of the embodiment of FIGURE 12.

FIGURE 12 shows an embodiment of my novel contacting device wherein the guide member serves as the stationary contacts of the system. FIGURE 12 more specifically shows an operating coil 200 through which a strong oscillatory capacitor discharge current may flow. A closed ring 201 serves as the secondary coil of a transformer having the primary coil 200 and, as in the previous embodiments, is repelled by the strong short circuit forces developed between the currents flowing in the coil 200 and the ring 201. Operating coil 200 is supplied with this current by means of the leads 202 and 203 which are connected to an energizing circuit. The movable contact 201 is then seen as cooperating with stationary contacts 204, 205. Contacts 204 and 205 as seen in FIGURES 12 and 12a are split into three parts by three slots and have a hole inside which makes them elastic in the radial direction in such a way as to make good positive contact to the movable contact 201. Hence, when the contacts are closed, the movable ring 201 is tightly jammed upon the outer cone of the contact 204 and makes good contact with the fixed contact 205 which is elastic and compressed radially by the ring 201. A current than can flow freely between the contacts 204 and 205 through the bridging contact 201.

Operating winding 200 of FIGURE 12 is more specifically shown as being embedded in the potted compound body 206 which could be made from an epoxy resin filled with chopped fiberglass or a similar strong filler. This potted compound further contains the retaining rings 207 and 208. Rings 207 and 208 may be made of stainless steel to add to the strength of the body and may be slotted to prevent their forming a short circuit winding of their own.

Cylinder 208 is bolted to the upper electrode 205 by means of the bolts 212, and contact 201 is disposed to travel into cylinder 209 at great velocity when operating winding 200 is energized. When the movable contact 201 disappears completely in the cylinder 209, there will be an open gap between the electrodes 204 and 205 and a circuit is opened.

When the movable contact 201 travels inside of cylinder 209, it compresses air in the cylinder which can escape only with difficulty around the rim of the movable contact 201. At the end of its upward stroke, the movable piece 201 hits the reset piece 210 with a much reduced shock because the compressed air has absorbed most of its kinetic energy which appears as heat in the surrounding air.

The moving ring 201 is then held in the uppermost position by the expanding spring action of the upper electrode 205. The movable contact 201 can then be reset to its original position by lowering the reset piece 210a of the reset piece 210.

Figure 13:
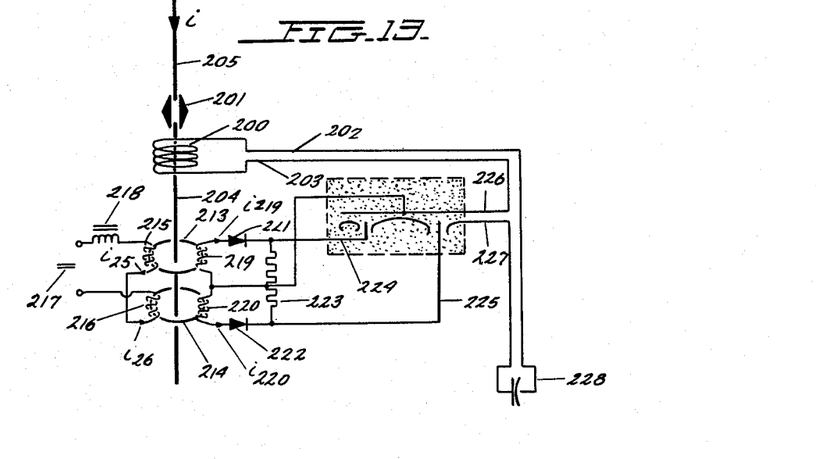
FIGURE 13 shows a schematic view of one application of the embodiment of FIGURE 12.
Figures 15A, 15B:
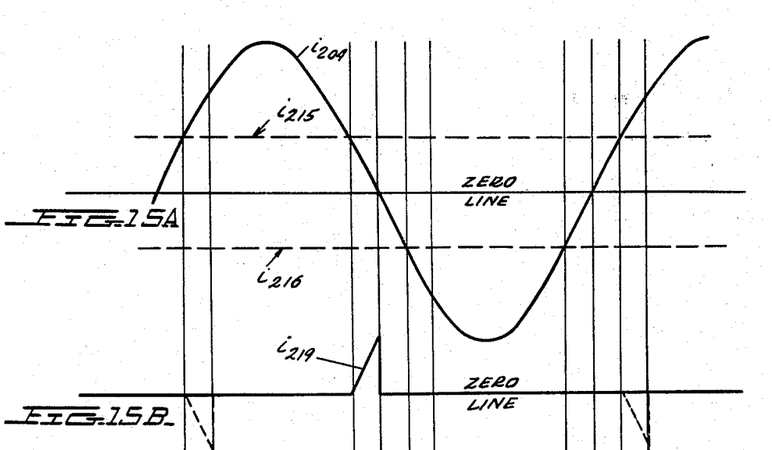
FIGURES 15a, 15b and 15c show current time characteristics for the operation of the circuit of FIGURE 13.
Figure 15C:
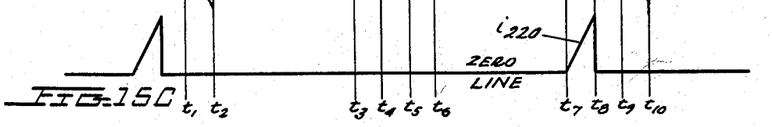

The contact device of FIGURE 12 is seen as applied to a circuit in FIGURE 13 and the operating is graphically shown in FIGURE 15. Magnetic cores 213 and 214 are lodged around the conductor 204 which is a portion of the circuit being protected. They are made of a type of easily saturable magnetic material wound in form of a toroidal core. Cores 213 and 214 are supplied with the bias windings 215 and 216 which are energized from the D.C. source 217 over a choke 218.

FIGURE 15a shows the current flowing through conductor 204 as $i_{204}$. The equivalent value of the bias current is coil 215 is shown as $i_{215}$, and the equivalent bias current in coil 216 is shown as $i_{216}$.

Considering the core 213, the bias current $i_{215}$ and the main current $i_{204}$ compensate each other at the time $t-1$, which causes this core 213 to unsaturate and a current pulse is now transformed into the output coil 219 as shown in FIGURE 15b. If the current $i_{204}$ is smaller than the bias current flowing into the coils 215 and 216, this transformation does not occur and no voltage is induced in the windings 219 or 220. The output of coils 219 and 220 is rectified in the rectifiers 221 and 222 and negative voltage pulses like the one produced in the interval time of the time $t-1$, $t-2$ of FIGURE 15b do not pass and therefore no voltage appears on the resistor 223.

Circuit connections are thus provided such that the output of the rectifiers 221 and 222 appears on the electrodes 224 and 225, respectively. The electrodes 224 and 225 are further constructed to be positioned in a radioactive gaseous medium as described in co-pending applicaton Serial No. 558,348, filed January 10, 1956, now Patent Number 2,971,130, granted February 7, 1961, and assignee of the instant application. A high voltage appearing on either of these electrodes will flash them over to the electrode 226, which then can also draw an arc from the electrode 227. The electrodes 226 and 227 are kept at a high voltage by the capacitor 228 which is charged by an auxiliary trickle charger which is not shown in FIGURE 13.

It is, therefore, seen that when the current $i_{204}$ is larger than the bias current as shown in FIGURE 15a, a positive voltage pulse is induced in winding 219 between the time interval $t-3$ and $t-4$ as shown in FIGURE 15b. This will cause the gap 226–227 to flash over and discharge capacitor 228 through the operating winding 200.

Current pulses which are induced in the negative direction are shown in dotted lines in FIGURES 15b and 15c. Only the positive current pulses as shown by the solid line between $t-3$ and $t-4$ of FIGURE 15b and $t-7$ and $t-8$ of FIGURE 15c can flow through the rectifiers 221 and 222. The resistor 223 permits the reverse current of these rectifiers to flow and prevents voltage from appearing on the electrodes 224 and 225 during the negative half cycle.

By adequately choosing the magnitude of the bias current, it is seen that it is possible to initiate contact interruption by advancing the current pulses in such a way that at the time the current goes through zero, the capacitor 228 will be discharged. If the contact interrupts a short time before the current goes through zero, a small arc is formed in an extremely strong magnetic field which makes this arc rotate very rapidly around the vertical axis of the circuit breaker. This arc then is burning between cold electrodes and its current goes through zero almost immediately after the arc is formed to quench the arc and prevent further burning.

Figure 14:
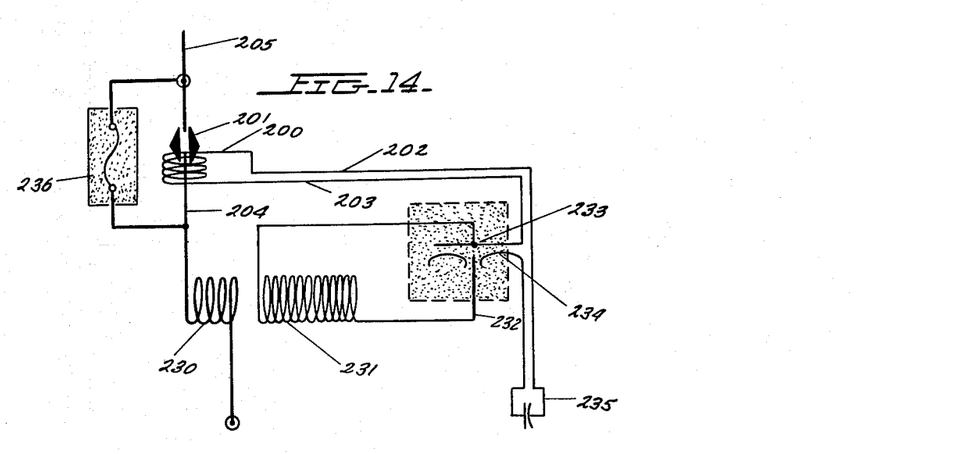
FIGURE 14 shows a schematic view of another application of the embodiment of FIGURE 12.

FIGURE 14 shows a further application of the embodiment of FIGURE 12. A heavy current induction coil 230 having an air core mutual induction coil 231 with many turns is connected in series with the contacts 204 and 205. If the rate of rise of current in the coil 230 suddenly assumes a very high value, a high voltage pulse is induced in coil 231 causing an arc between the electrodes 232 and 223. This, in turn, causes an arc between the electrodes 233 and 234 discharging the capacitor 235 into the coil 200 which then opens the contact between the electrodes 204 and 205 by displacing the sliding contact 201 upwardly. The circuit is now closed through the fuse 236 which is a relatvely low current fuse and which blows almost instantaneously. During the time which the fuse 236 needs to interrupt, the contact 201 has travelled far enough upward to prevent any arc to form. Hence, circuit interruption is achieved without arcing between the main contacts 201, 204 and 205 and in the absence of special circuits to assure current interruption immediately prior to a zero current value.

Figure 16:
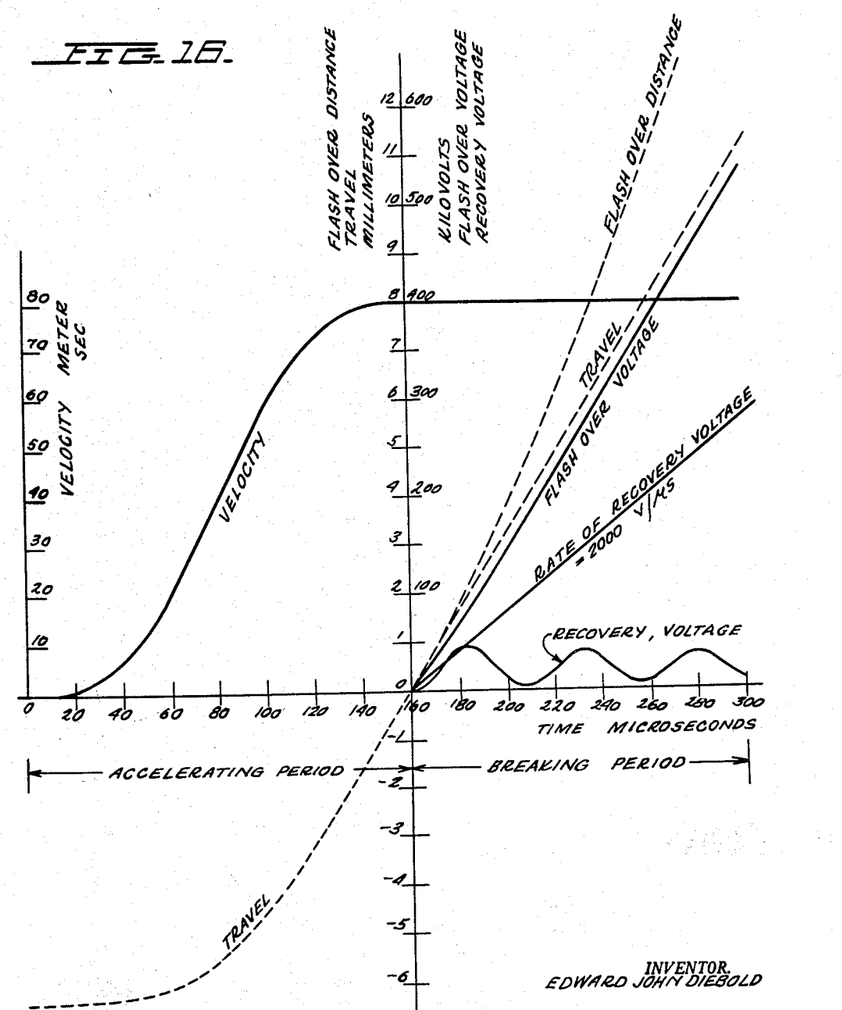
FIGURE 16 shows a graphical representation of the operation of my novel device.

The principle of operation of my novel device may be more fully understood with reference to FIGURE 16 and FIGURE 1. The travel-time curve of a device as shown in FIGURE 1 follows an equation:

$$X = \alpha t^4 - B t^5 + \gamma t^6 - \ldots$$

where $\alpha$, $B$, and $\gamma$ are constants depending on the particular structure involved. Hence, the travel of the movable coil and contact structure occurs very sluggishly at first, but it at a very high rate once it starts moving. Accordingly, it is essential that the contacts remain in engagement as long as the travel is slow and are separated only when the contact moves at high speed.

FIGURE 16 shows the operation of the embodiment of FIGURE 1. From the moment a current is initiated in coil 30 until the movable contact 32 has moved upwards, far enough to be entirely disengaged from the fixed contacts 30 and 31, there is a time delay of 160 microseconds (0.000160 second). At this time the velocity of the contact is 80 meters per second. Accordingly, when the contacts separate, the flash-over distance increases rapidly which means that the flash-over voltage increases with about the same rate. For this reason the recovery voltage, which rises less rapidly than the flash-over voltage, is unable to flash-over the opening circuit breaker.

A major drawback of the system described previously is the poor efficiency of the drive. Energy stored in the capacitor is released to become magnetic field energy in the drive coil. Magnetic field energy effects displacement of coils, causing decrease of field energy and increase of kinetic energy of the moving bodies. Due to the inherent geometry of the air coils, the energy transferred to kinetic form is relatively small and the major part of the energy oscillates between capacitor and variable inductor causing variable frequency oscillation which is a loss for the system. Practically attainable efficiency is on the order of 1 to 5 percent (ratio of kinetic energy to capacitor energy) and this low efficiency has several drawbacks:

(1) High energy capacitors are expensive and bulky.
(2) Waste magnetic energy tends to explode coils.
(3) Tripping circuits must handle waste energy.
(4) Short relative motion uncouples coils which makes the system ineffective after a short travel.

Bolt 35 in FIGURES 1, 2 and 3 and bolt 146 in FIGURE 11 may be made from a ferrite, i.e., a ferromagnetic ceramic material of the form $XFe_aO_4$ where X stands for a metal such as manganese, iron, copper, nickel, cobalt, magnesium, lithium, etc. Multiple ferrites are known to have very high permeability (of the order of 1000) and a resistivity several billion times higher than ordinary magnetic materials. A center post made of such a material or a bolt surrounded by a sleeve of such a material will carry a high density and high frequency magnetic flux to effect a magnetically close coupling between the drive coil and the driven coil. In view of the high permeability of this material, the magnetic energy contained in the initial magnetic field will be extremely low, causing an extremely steep and high rate of increase of the driving current. This in turn causes a rapidly increasing relative motion of the coils. By virtue of the magnetic core in the coils the coupling between them remains high in spite of the increasing distance, effecting a repelling action over a much larger period of time and distance as obtainable without the magnetic core.

Accordingly, the following advantages are had with the use of the ferrite post:

(1) Drive capacitor, small cheap.
(2) Lower stresses on coils.
(3) Faster initial motion of coils.
(4) Tripping circuit for lower energy.
(5) Drive maintained for substantial motion (fast acceleration of open breaker).

In the foregoing the invention has been described solely in connection with specific illustrative embodiments thereof. Since many variations and modifications of the invention will now be obvious to those skilled in the art, I prefer to be bound not by the specific disclosures herein contained but only by the appended claims.

I claim:

1. A protective circuit for a contact device; said contact device comprising a pair of cooperable contacts relatively movable into and out of engagement with one another; a first winding and energizing means for said first winding; one of said cooperable contacts being a second winding; said second winding being positioned to have a current induced therein responsive to energization of said first winding; the magnetic fields of said first and second windings being in a direction to repel one another to thereby effect relative motion between said pair of cooperable contacts; said protective circuit including energizing means for energizing said first winding; said energizing means including means responsive to the current through said cooperable contacts; said energizing means energizing said first winding at a predetermined time prior to an instantaneous zero current value for the current through said cooperable contacts; said energizing means including magnetic means magnetically coupled to said circuit through said cooperable contacts; said energizing means including magnetic means magnetically coupled to said circuit through said cooperable contacts, a capacitor, and a switching means; said capacitor being normally charged; said switching means being connected in circuit relation with respect to said capacitor to normally prevent discharge of said capacitor; said switching means being operable to a closed position to permit discharge of said capacitor; circuit connections for transmitting the energy discharged by said capacitor to said first winding; said switching means being coupled to said magnetic means and being operated to said closed position at said predetermined time.

2. A protective circuit for a contacting device comprising a movable contact and a complementary contact engageable by said movable contact; said movable contact being formed of a conductive electrically energizable winding generating a magnetic field when energized and means positioned for generating a magnetic field for repelling said first mentioned magnetic field; and energizing means for energizing said first winding; said protective circuit including energizing means including means responsive to the current through said cooperable contacts; said energizing means energizing said first winding at a predetermined time prior to an instantaneous zero current value for the current through said cooperable contacts; said energizing means including magnetic means magnetically coupled to said circuit through said cooperable contacts, a capacitor, and a switching means; said capacitor being normally charged; said switching means being connected in circuit relation with respect to said capacitor to normally prevent discharge of said capacitor; said switching means being operable to a closed position to permit discharge of said capacitor; circuit connections for transmitting the energy discharged by said capacitor to said first winding; said switching means being coupled to said magnetic means and being operative to said closed position at said predetermined time.

3. An operating circuit for an electrodynamic circuit interrupter therefor; said electrodynamic circuit breaker comprising a stationary contact structure and a movable contact structure movable between an engaged and disengaged position with respect to said stationary contact structure; at least a portion of said movable contact structure forming a current carrying path with at least a portion of said stationary contact structure; at least a portion of said movable contact structure defining a short circuited winding; said operating circuit including an energizing winding positioned immediately adjacent said short circuited winding when said movable contact structure is in said engaged position and means for energizing said energizing winding; said means for energizing said energizing winding including means responsive to current through said current path; a source of energy normally disconnected from said energizing winding and connecting means operable to connect said energy source to said energizing winding; said means responsive to current through said current path being connected to said means operable to connect said energy source to said energizing winding and delivering an operating signal thereto under predetermined conditions; said means operable to connect said energizing winding being operable only prior to zero instantaneous current through said current path.

4. A protective circuit for an electrodynamic circuit interrupter; said electrodynamic circuit breaker comprising a stationary contact structure and a movable contact structure movable between an engaged and disengaged position with respect to said stationary contact structure; at least a portion of said movable contact structure forming a current carrying path with at least a portion of said stationary contact structure; at least a portion of said movable contact structure defining a short circuited winding; said energizing means including an energizing winding positioned immediately adjacent said short circuited winding when said movable contact structure is in said engaged position; said protective circuit including means for energizing said energizing winding; said means for energizing said energizing winding including means responsive to current through said current path; a source of energy normally disconnected from said energizing winding and connecting means operable to connect said energy source to said energizing winding; said means responsive to current through said current path being connected to said means operable to connect said energy source to said energizing winding and delivering an operating signal thereto under predetermined conditions; said means operable to connect said energizing winding being operable only prior to zero instantaneous current through said current path; said means operable to connect said energy source to said energizing winding including a normally charged capacitor and a switching means connected in discharge controlling relation with respect to said capacitor; said switching means being conditioned to operate to a closed condition responsive to signals derived from said means responsive to current through said current path at any instant and being closed after receiving said signals at a time prior to said zero instantaneous current.

5. In a contacting device for an electrical circuit; a capacitor, means to maintain said capacitor in a charged condition, a switching means, an operating winding and a pair of cooperable contacts; said cooperable contacts being constructed to be moved to a disengaged position responsive to the discharge of said charged capacitor through said operating winding; said capacitor being connected to said operating winding responsive to operation of said switching means to thereby discharge through said operating winding; a current transformer; fault sensing means and means to advance the phase of the output current of said current transformer; said current transformer being connected to continuously measure the current flowing in said electrical circuit; said fault sensing means being operable responsive to occurrence of a predetermined condition in said electrical circuit; circuit connections for connecting the output current of advanced phase to a transductor means whereby an output pulse is produced at a time prior to zero current in said electrical circuit corresponding to the advanced phase of the output current of said phase advancing means; said switching means being constructed to connect said capacitor to said operating winding responsive to energization by said output pulse of said transductor means; said fault sensing means being constructed to complete circuit connections between said transductor means and said switching means responsive to the occurrence of said predetermined condition in said electrical circuit to thereby allow the output pulse of said transductor means to operate said switching means at a time immediately prior to the occurrence of a zero current value in said electrical circuit following the occurrence of said predetermined condition.

References Cited in the file of this patent
UNITED STATES PATENTS

| | | |
|---|---|---|
| 1,287,231 | Chubb | Dec. 10, 1918 |
| 1,827,940 | Greenwood | Oct. 20, 1931 |
| 2,261,686 | Kesselring | Nov. 4, 1941 |
| 2,290,683 | Gieffers | July 21, 1942 |
| 2,499,394 | Kesselring | Mar. 7, 1950 |
| 2,691,128 | Wegener | Oct. 5, 1954 |
| 2,774,920 | Kesselring | Dec. 18, 1956 |
| 2,942,155 | Loeffler | June 21, 1960 |
| 2,951,188 | Diebold | Aug. 30, 1960 |
| 2,971,130 | Diebold | Feb. 7, 1961 |

FOREIGN PATENTS

| | | |
|---|---|---|
| 422,775 | Great Britain | Jan. 17, 1935 |

OTHER REFERENCES

The Electric Journal, vol. 34, No. 5, May 1937, pages 193, 194.